United States Patent [19]

Obermoller

[11] 4,076,188

[45] Feb. 28, 1978

[54] BLOWER AND BURNER TO PRODUCE SUPERPRESSURE IN A THERMAL AIRSHIP

[75] Inventor: Douglas B. Obermoller, Sioux Falls, S. Dak.

[73] Assignee: Raven Industries, Inc., Sioux Falls, S. Dak.

[21] Appl. No.: 687,913

[22] Filed: May 19, 1976

[51] Int. Cl.² .............................................. B64B 1/58
[52] U.S. Cl. ...................................... 244/98; 244/97
[58] Field of Search .................... 244/96, 97, 98, 31

[56] References Cited

U.S. PATENT DOCUMENTS

| 1,509,527 | 9/1924 | Parker | 244/97 |
|---|---|---|---|
| 1,866,079 | 7/1932 | Blondin | 244/98 |
| 2,331,404 | 10/1943 | Liebert | 244/97 |
| 3,096,047 | 7/1963 | Dunn | 244/97 |
| 3,170,658 | 2/1965 | Yost | 244/98 |

FOREIGN PATENT DOCUMENTS 1,295,927  11/1972  United Kingdom ................. 244/97

Primary Examiner—Trygve M. Blix
Assistant Examiner—Charles E. Frankfort
Attorney, Agent, or Firm—Hill, Gross, Simpson, Van Santen, Steadman, Chiara & Simpson

[57] ABSTRACT

A thermal airship including an elongate gas envelope of a soft material providing a hull for the airship with tail members, a gondola carried below the hull, a power propelling system supported by the hull and a system for pressurizing the soft envelope through an inflation opening with the gondola adjoining the hull surrounding the inflation opening in a sealed manner. The system for pressurizing includes a blower mounted on the hull extending through the opening and directing a flow of air past a burner within the interior of the envelope and a lateral baffle between the burner and blower deflecting an amount of the air from the blower laterally directly into the envelope interior.

11 Claims, 3 Drawing Figures

U.S. Patent      Feb. 28, 1978      4,076,188
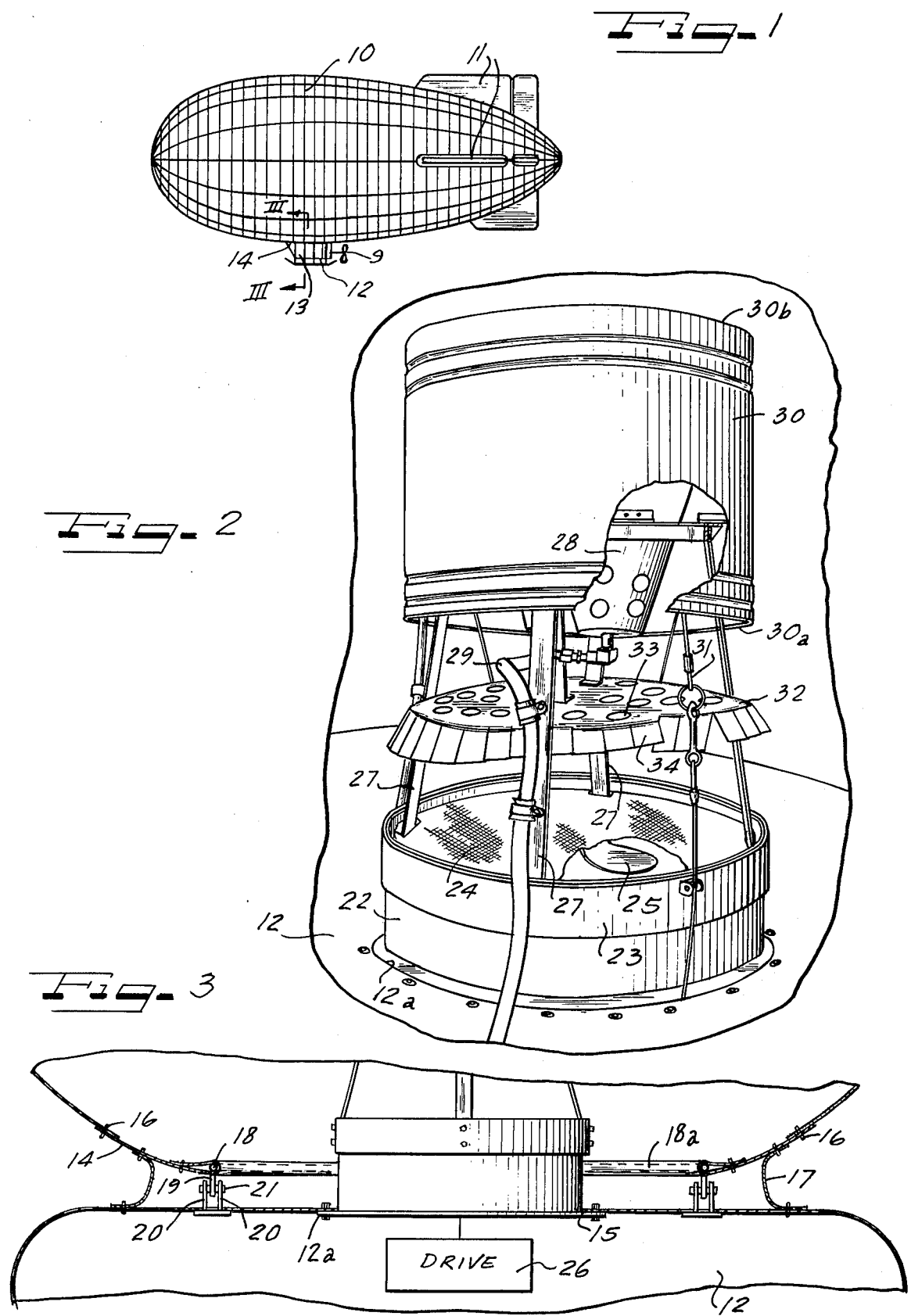

BLOWER AND BURNER TO PRODUCE SUPERPRESSURE IN A THERMAL AIRSHIP

BACKGROUND OF THE INVENTION

The invention relates to improvements in powered airships, and more particularly to a powered airship having a flexible envelope inflated and superpressurized by hot air and capable of directed flight for transporting loads over distances and to an improved method and means for pressurizing the hull envelope.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and Dacron, or of suitable other material which is lightweight, high temperature resistant, extremely strong and impermeable to gas leakage. The envelope of the airship is horizontally elongate and is primarily symmetrical with load lines distributed over the body of the envelope for carrying a payload therebelow.

The plastic fabric envelope when not in use can be folded and shipped or stored in the space which takes up less than 1% of its inflated volume. The envelope can be relatively rapidly inflated by the operation of a fan and the free lift is controllable by control of a burner which controls the temperature of the air within the envelope. The direction of flight is controlled by tail fins at the aft end of the airship envelope. These tail surfaces preferably include a rigid or stable portion which stabilizes the airship in horizontal flight, and a manipulable portion which changes the direction of flight. Vertically extending control surfaces are pivoted to the left or right to change the direction of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces.

The features of the present invention relate particularly to an improvement for maintaining the airship envelope under a superpressure so that the skin of the envelope will remain essentially taut, and the envelope will retain its aerodynamic shape during flight. The mechanism for superpressurizing the envelope is so constructed to heat the air which enters the envelope and maintain heat within the envelope so as to provide adequate free lift for carrying the envelope and its controls with its payload. The arrangement is unique in that it employs a blower arrangement integrally constructed with a burner which act together as a system and provide an integral part of the airship itself. The arrangement provides for better heat distribution throughout the total air volume within the envelope, and because of the reliable superpressurizing inflation capabilities, it is possible to provide an envelope of soft material which has a semi-rigid to rigid shape and which eliminates the need for any external or internal supportive structure. This will also substantially lessen the aerodynamic drag forces encountered when moving this semi-rigid shape through the air. The integral arrangement eliminates the need for any outside or remote blowers to provide air for initial inflation of the envelope, and when the airship is ready for take-off or when stored, initial inflation to bring it to flying shape is accomplished by the same equipment which maintains the free lift within the envelope during flight.

In accordance with the invention, the burner is mounted directly in the airstream of the blower enabling it to heat the air passing into the envelope. The burner is so constructed so as to provide a sufficient heat level of the air already inside the envelope in order to maintain the required lifting ability. For reliability and rigidity, a unique support system is provided for attachment of the gondola to the airship envelope, and the blower is permanently mounted to the gondola making it an extension of the gondola superstructure. The blower is driven by its own power source which is located in the gondola immediately available to the operator therein. The interconnection between the gondola and envelope are such that the blower and burner are completely enclosed by the envelope and gondola of the airship and not subjected to external weather conditions or temperatures.

It is accordingly an object of the present invention to provide an improved method and mechanism for initially inflating an airship formed of an envelope of soft material and for also maintaining the inflation of the envelope during flight so as to provide a semi-rigid or rigid aerodynamically shaped flight structure.

A further object of the invention is to provide a unique relationship between the gondola airship envelope and inflation and air heating mechanism which is completely reliable in flight, readily accessible for control and tension during flight and so constructed as to not interfere with the aerodynamic capabilities of the airship.

Another object of the invention is to provide a unique blower and burner arrangement for heating the incoming air which is directed into the hull envelope and for maintaining the proper temperature of the air therein during flight.

Other objects, advantages and features, as well as equivalent structures and methods which are intended to be covered herein, will become more apparent with the disclosure of the preferred embodiments in connection with the teaching of the principles of the invention, as described and shown in the specification, claims and drawings, in which:

DRAWINGS

FIG. 1 is an elevational view of an airship assembly constructed and operating in accordance with the principles of the present invention;

FIG. 2 is an enlarged detailed view showing the pressurizing and heating mechanism for directing air into the airship envelope; and FIG. 3 is an enlarged detailed view with portions removed, taken substantially along line III—III of FIG. 1.

DESCRIPTION

FIG. 1 shows an aerodynamically shaped airship envelope forming a hull for an airship capable of carrying a payload. The envelope is elongate, and at the aft end carries tail members 11 which stabilize the airship during flight and which can be moved by controls to cause the airship to travel to the left or right and to guide the airship up or down for ascending and descending.

Below the airship is supported a gondola 12 which is carried by cables extending up in the hull envelope. The gondola enclosure is made substantially integral with the hull envelope thus reducing the exposed surface and reducing the drag which might be caused by exposed supports which carry the gondola a distance below the envelope. The gondola is provided with a thrust propeller 9 for moving the airship forward over the ground to travel from one location to another and a drive motor for the propeller is carried within the gondola.

The envelope is constructed so as to have an opening 18a at the base above the gondola and an annular insert 14 is fitted into the opening with the insert suitably attached along its edge by snaps 16 or by a zipper arrangement as illustrated generally in FIG. 3.

The gondola 12 is constructed with a flat upper portion which is close to the insert 14 in the envelope and to additionally seal the opening, a skirt or gasket flap 17 extends between the gondola and the insert and may be releasably snapped to the gondola roof. To further attach the gondola to the insert, the insert has an annular opening therethrough with an aluminum tubing 18 at the edge of the opening 18a and the tubing is covered by turning the material of the insert back over the tubing to enclose it. The insert 14 may be made of a material such as reinforced Dacron which may be the same as the material of the airship envelope. The gondola may have a series of bifurcated upwardly extending projections 20 with lateral holes therethrough to receive tongues 19 projecting down from the tubing 18. The projections are shown generally at 20 receiving the tongues 19 and pins 21 may extend through aligned holes to fasten the gondola 12.

At the roof of the gondola, is an opening 15 in which the airship pressurizing and inflating mechanism is mounted. The pressurizing and inflating mechanism is shown in more detail in FIG. 2, and forms an assembly which is rigidly mounted on the roof of the gondola. The roof of the gondola 12 has an opening 15 and a flange 12a of the pressurizing and inflating assembly is bolted along its edges in the opening 15. A base 22 forms part of the framework of the inflation assembly. The frame includes vertical legs 27 which extend upwardly from the cylindrical base 22 and carry the burner assembly at their upper end. The burner assembly contains one or more burners shown generally at 28. These burners may be of a conventional construction, and preferably are fueled by propane through a fuel line 29 which leads upwardly along the framework from the gondola. The burners may include a central orifice arrangement with an outer jacket and a recirculating arrangement may be provided so that the propane fuel will first pass down through a hollow jacket on the burner and then flow through the orifice with the hollow jacket serving as a preheater for the fuel. Suitable valved controls are provided operated by a thermostat means within the airship envelope and additionally controlled by manual overrides operated by the pilot within the gondola.

The burner arrangment is contained within an enclosing annular shroud 30. The shroud is in the form of a shaped sheet metal hoop open at the lower end 30a and open at the upper end 30b so that air flows upwardly therethrough heated by the burners and passes through the upper end into the interior of the hull envelope.

In some instances, it may be desirable to provide an additional control by making the burners limitedly tiltable supporting them on gimbals, not shown, and for this purpose, a cable 31 may extend downwardly. The gimbals are arranged so that they provide a lateral across ship access for the burners so that the heat can be directed rearwardly or forwardly into the tail or nose of the airship. This construction, however, has been found to not be required, and may be used as an alternative only when necessary, such as when an exceedingly aerodynamic airship envelope is used.

The blower beneath the burner includes a blower fan 25 which is enclosed in a protective housing including a ring 23 with a protective screen 24 thereabove. The blower will be powered by a drive unit 26 fueled from the gondola below and at a location where it can be tended by the operator. It is necessary that the blower operate continuously during the flight of the aircraft, although the burner is regulated in its heat output by controls. For example, a pilot flame may be included in the burner with the burner turned on and off to maintain a predetermined temperature in order to provide the free lift required.

In accordance with the invention, an air deflection baffle 32 is positioned in the air flow stream emitting from the blower to intercept and deflect a portion of the air flow. This will cause a portion of the blower air to pass directly into the hull for pressurizing it at a superpressure without being heated. This will also somewhat protect the burner from the direct flow of air which could tend to extinguish the flame. The burner with its surrounding shroud which will be heated, heats the incoming flow of air into the hull and also maintains the heat and contributes heat to the air within the hull by convection and radiation of the burners and the shroud.

The lateral baffle 32 which deflects the flow of air is provided with a distribution of openings 33 therethrough and shows them to be of a size to permit at least one-half of the air from the blower to pass up through the burner. At the edge of the baffle, it is flanged downwardly toward the flow of air so as to help distribute the portion of air which does not pass through the burner. The deflection and distribution of the air helps maintain a good heat distribution air flow at the location of the burner, and helps distribute a uniform distribution of warm air both to the fore and aft end of the airship hull.

While the preferred form is illustrated, an alternate form would be to mount the burner and burner and blower at separate and different locations, but it is necessary to maintain a constant circulation of air over the burner. A disadvantage of separate locations is that it can result in uneven heat distribution which is avoided by the preferred arrangement. It is also possible to mount the blower and burner as a system as it is shown, but to mount it externally of the envelope and as a separate unit with conduit means leading into the envelope. It is, however, essential that the blower be arranged to be continually ducted into the envelope and to operate continuously to maintain the superpressure within the envelope during flight.

I claim as my invention:

1. A thermal hot air airship comprising in combination:
   a flexible elongate heated air lifting envelope aerodynamically shaped for horizontal flight providing a hull for the airship;
   tail members on the aft end of the airship for controlling the horizontal flight;
   a gondola carried below the hull for supporting a payload;

power propelling means on the airship for propelling the airship horizontally;

means defining a pressurizing inflation opening leading into the hull;

hot air pressure generating means comprising an integral blower and controlled burner means interiorly of the pressurizing inflation opening and on the interior of the envelope for pressurizing and inflating the soft envelope with heated air to supply substantially the entire lift during flight, said blower being positioned at the hull inflation opening for moving a flow of air through the hull opening for inflating the envelope with a superpressure, said controlled burner means being positioned downstream of the blower in the interior of the envelope and in the path of air flow for heating the air passing into the envelope interior.

2. A thermal airship constructed in accordance with claim 1:

wherein said burner is surrounded by an annular shroud and said shroud and burner are located within the envelope.

3. A thermal airship constructed in accordance with claim 1:

wherein said inflation opening is located in an insert in the envelope with means securing the edge of the insert to the envelope and means securing the insert to the gondola.

4. A thermal airship constructed in accordance with claim 3:

wherein said blower and burner are supported on the gondola.

5. The airship of claim 1 in which the hot air pressure generating means is mounted on a roof of the gondola and is surrounded by a protecting wall continuous between the gondola roof and the hull.

6. A thermal airship comprising in combination:

an elongate gas envelope aerodynamically shaped for horizontal flight providing a hull for the airship;

tail members on the aft end of the airship for controlling the horizontal flight;

a gondola carried below the hull for supporting a payload;

power propelling means supported by the hull for propelling the airship horizontally;

means defining a pressurizing inflation opening leading into the hull;

hot air pressure generating means for pressurizing the soft envelope with heated air during flight including a blower carried on the hull positioned for moving a flow of air through the opening for inflating the envelope with a superpressure;

a controlled burner within the hull envelope positioned in the path of air flow heating the air passing into the envelope interior; and a baffle positioned between the blower and burner for deflecting a portion of the air passing from the blower to the burner and located within the envelope so that the deflected portion passes within the envelope.

7. A thermal airship constructed in accordance with claim 6:

wherein said baffle includes a plate extending transversely of the flow of air with a plurality of openings therethrough.

8. A thermal airship constructed in accordance with claim 7:

wherein said baffle includes a flanged edge at an angle to the plate projecting toward the oncoming air flow from the blower.

9. A thermal airship comprising in combination:

an elongate gas envelope aerodynamically shaped for horizontal flight providing a hull for the airship;

tail members on the aft end of the airship for controlling the horizontal flight;

a gondola carried below the hull for supporting a payload;

power propelling means supported by the hull for propelling the airship horizontally;

means defining a pressurizing inflation opening leading into the hull;

hot air pressure generating means for pressurizing the soft envelope with heated air during flight including a blower carried on the hull positioned for moving a flow of air through the opening for inflating the envelope with a superpressure;

a controlled burner positioned in the path of air flow heating the air passing into the envelope interior;

wherein said inflation opening is located in an insert in the envelope with means securing the edge of the insert to the envelope and means securing the insert to the gondola; and wherein said insert has a flap skirt forming a seal between the insert and gondola.

10. A thermal airship comprising in combination:

an elongate gas envelope of a soft material aerodynamically shaped for horizontal flight providing a hull for the airship;

tail members on the airship for controlling the horizontal flight;

a gondola carried below the envelope for supporting a payload;

power propelling means supported by the envelope for propelling the airship horizontally;

a blower positioned on the envelope for directing a continual flow of air into the envelope interior for superpressurizing the envelope;

a burner within the envelope mounted in the path of the stream of the air from the blower;

and means between the blower and burner deflecting a portion of the air away from the burner so that a portion of the blower air pressurizes the airship without being directly heated by the burner.

11. The method of pressurizing a thermal hot air airship of a soft material with the airship having an elongate aerodynamically shaped envelope, a pressurizing inflation opening, and having means for propelling the airship and a tail for guiding the airship with a gondola below the envelope, the method comprising:

providing an integral blower and controlled burner interiorly of the pressurizing inflation opening in the interior of the envelope;

directing a continual flow of air from the blower into the envelope interior for superpressurizing and supporting the envelope;

positioning said burner within the interior of the envelope in the path of the air flowing into the envelope to heat the air and provide substantially the entire lift;

and deflecting a portion of the air flowing into the envelope away from the burner so that the envelope is superpressurized by some air not directly heated by the burner and the burner within the envelope heats the air both by air passing thereover and by radiation and convection to the surrounding air.

* * * * *